(12) United States Patent
Kuo

(10) Patent No.: US 6,832,517 B1
(45) Date of Patent: Dec. 21, 2004

(54) OPTICAL LEVEL DETECTOR

(75) Inventor: Yang Kuao Kuo, Jhubei (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 0 days.

(21) Appl. No.: 10/696,292

(22) Filed: Oct. 29, 2003

(51) Int. Cl.[7] .......................... G06K 7/15; G01N 21/86
(52) U.S. Cl. ........................ 73/293; 250/557; 250/548
(58) Field of Search .............................. 73/293, 290 R; 250/577, 573, 557, 548

(56) References Cited

U.S. PATENT DOCUMENTS

| | | |
|---|---|---|
| 3,821,558 A | 6/1974 | Mansfield |
| 4,053,227 A | 10/1977 | Bodlaj |
| 4,524,282 A | 6/1985 | King |
| 5,502,311 A * | 3/1996 | Imai et al. .................. 250/548 |
| 5,948,572 A | 9/1999 | Liu et al. |

* cited by examiner

Primary Examiner—Hezron Williams
Assistant Examiner—Tamiko Bellamy
(74) Attorney, Agent, or Firm—Duane Morris LLP

(57) ABSTRACT

In an apparatus for monitoring any deviation of a planar surface from its desired position, a light source and a light detector are positioned so that when the surface is at the desired position a beam of light projected by the light source is reflected by the surface and fully registers on the light detector causing the light detector to generate a peak output signal. When the surface deviates from its desired position, the reflected beam of light does not fully register on the light detector, causing the light detector to generate less than peak output signal.

9 Claims, 8 Drawing Sheets

OPTICAL LEVEL DETECTOR

FIELD OF THE INVENTION

This invention relates to electro-optical devices for monitoring the attitude or level of a surface in reference to a reference plane.

SUMMARY OF THE INVENTION

According to an aspect of the present invention, an optical level detector, an apparatus for detecting whether or not a planar surface is deviated from its desired plane is disclosed. This apparatus is particularly useful for detecting positional deviations caused by a vertical translation of the planar surface, including vertical translations caused by any pitch or roll. In the apparatus, a light source and a light detector are positioned so that when the surface is at the desired position, i.e. the position of the reference plane, a beam of light projected by the light source is reflected by the surface and fully registers on the light detector. In response, the light detector generates an output electrical signal that is at its peak value. If the surface deviates from its desired position, the reflected beam of light will not fully register on the light detector and the resulting output signal will be less than the peak value.

Two or more of these apparatuses may be used together to monitor the surface at different locations simultaneously. By monitoring multiple locations of the surface, a macro level deviation of the surface can be detected even when local areas of the surface may be at the reference plane. One application, in which the inventor has successfully implemented the optical level detector of the present invention is in the step-and-repeat tools used in the photolithography process in semiconductor manufacturing. Typical step-and-repeat tools (also known as steppers) hold a reticle for transferring circuit patterns on to wafers during the photolithography process. The stepper tool holds the reticle in a reticle stage and if the reticle is not properly level in the reticle stage, the circuit pattern being transferred on to the wafer will not be in focus. Thus, the optical level detector of the present invention provides the stepper tool to fast and accurately verify that the reticle is properly leveled in the reticle stage.

BRIEF DESCRIPTION OF THE DRAWINGS

The features shown in the above referenced drawings are not intended to be drawn to scale nor are they intended to be shown in precise positional relationship. The parts of the apparatus of the present invention appearing in more than one figure are designated by the same reference numbers.

DETAILED DESCRIPTION OF THE INVENTION

Figure 1:
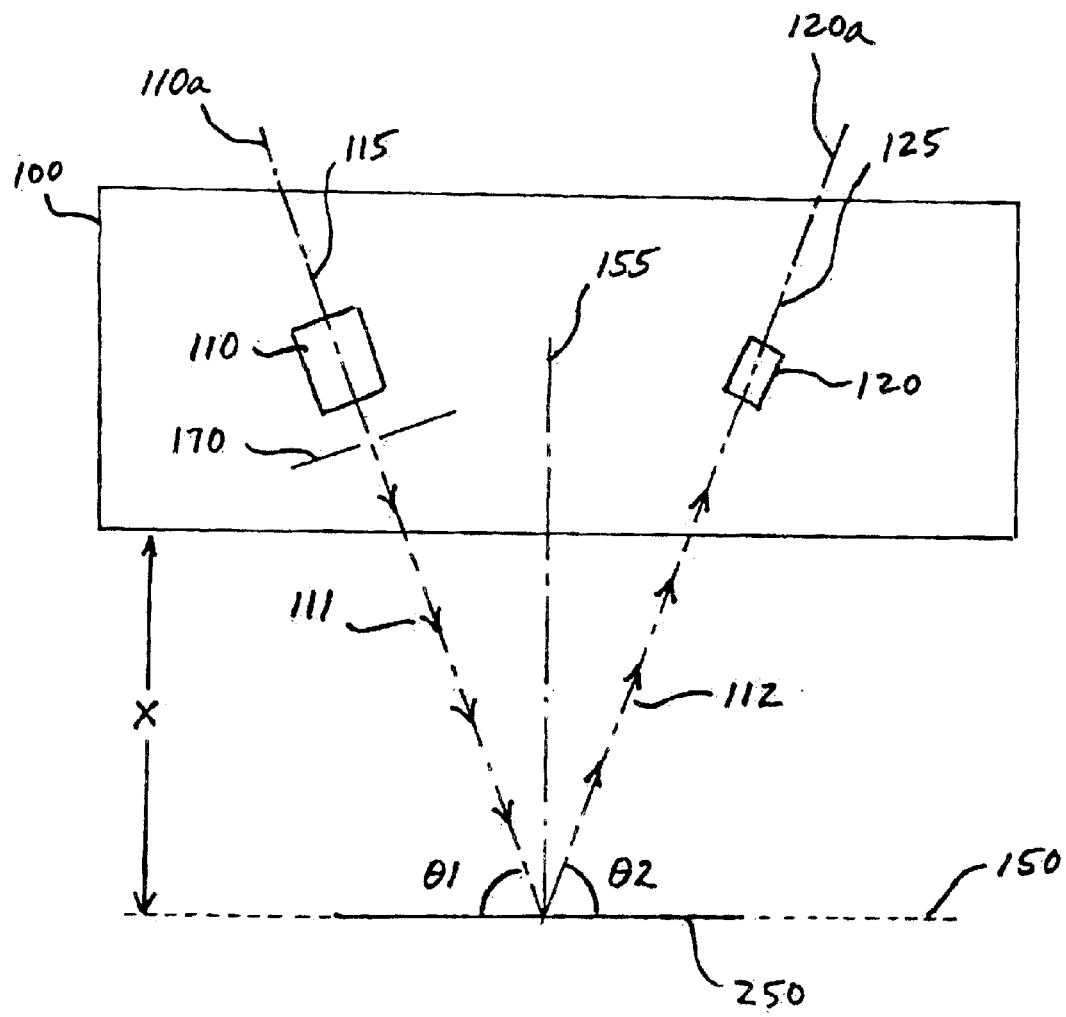
FIG. 1 is a schematic illustration of one embodiment of the apparatus of the present invention.

According to an embodiment of the present invention, depicted in FIG. 1 is an optical level detector 100 configured for monitoring whether a planar surface 250 has deviated from its desired position, represented by a reference plane 150. Reference plane 150 only represents a desired position for the planar surface 250 and does not represent a physical surface. Optical level detector 100 is positioned at a known distance X from the reference plane 150. The absolute value of the distance X is not important but it is important that the distance X be fixed and does not change once the optical level detector 100 is set up.

Associated with the reference plane 150 is its orthogonal axis 155, an incidence axis 115 and a reflection axis 125. The incidence axis 115 represents the path of an incident light beam 111 from a light source 110 incident to the reference plane 150 and defines a reference incidence angle $\theta 1$ between the reference plane 150 and the incidence axis 115. When a planar surface 250 is placed at the reference plane 150, the incidence beam 111 will be reflected by the planar surface and returned towards the optical level detector as a reflected beam 112. The reference reflection axis 125 represents the path of the reflected light beam 112 when the planar surface 250 is placed at the position defined by the reference plane 150, i.e. the desired position for the planar surface. The reference reflection axis 125 defines a reference reflection angle $\theta 2$, which is equal to the incidence angle $\theta 1$, between the reference plane 150 and the reference reflection axis 125. Therefore, by positioning a light detector 120 in line with the reference reflection axis 125, one may detect whether the planar surface 250 has deviated from the reference plane 150.

In the embodiment of the present invention illustrated in FIG. 1, the light source 110 is provided in the optical level detector 100 for projecting a narrow beam of light, the incidence beam 111, on to the planar surface 250. The light source 110 is preferably a laser or a light emitting diode but any other light source may be adopted for this purpose. The light source 110 projects the incidence beam 111 along its projection axis 110a. In this embodiment of the present invention, the light source 110 is positioned such that the projection axis 110a is coincident with the incidence axis 115. Thus, the incidence beam 111 propagates along the path defined by the incidence axis 115 and on to the planar surface 250. The incidence beam 111 is reflected by the planar surface 250 and travels back to the optical level detector 100 as a reflected beam 112. The optical level detector 100 is provided with a light detector 120 for receiving this reflected beam 112.

The light detector 120 is positioned with its viewing axis 120a coincident with the reference reflection axis 125 so that when the planar surface 250 is in its desired position, the reflected light beam 112 falls squarely on the light detector 120. The light detector 120 is preferably a device such as a photocell that converts the light energy of the reflected beam 112 into an electrical signal that can be readily detected and monitored. The voltage level of a typical photocell's output signal will vary proportionally with the intensity or the amount of light shone on the photocell. Thus, when the reflected beam 112 falls completely on the light detector 120 (i.e. fully registers with the light detector 120), the output signal of the light detector 120 will be at the peak voltage value possible with the reflected beam 112. If the reflected beam 112 falls on the light detector 120 only partially (i.e. does not fully register with the light detector 120), the output signal of the light detector will be at some voltage value less than the peak value.

This ensures that when a planar surface 250 is in its desired position, i.e. at the position represented by the reference plane 150, the reflected beam 112 will be coincident with the viewing axis 120a and the reflected beam 112 will completely register with the light detector 120. Thus, when the planar surface 250 is in its desired position, the light source's projection axis 110a, the incidence axis 115, the reference reflection axis 125, and the light detector's viewing axis 120a are coplanar with the orthogonal axis 155 of the reference plane 150. In this scenario, the output signal of the light detector 120 will exhibit a peak voltage value for the given planar surface and its light reflecting characteristics. It should be noted that the peak voltage value of the light detector 120 in this context does not necessarily mean the absolute peak voltage value that the light detector 120 is capable of producing. It refers to the peak voltage value that the light detector 120 will produce in the given configuration of the optical level detector 100.

If the planar surface 250 deviates from its desired position, the reflected beam 112 will not be coincident with the reflection axis 125 and, in turn, not coincident with the viewing axis 120a of the light detector 120. Thus the reflected beam 112 will not completely register with the light detector 120. Depending on the degree of the deviation, the reflected beam 112 could completely miss the light detector 120 or only partially register with the light detector 120. In either case, the resulting output signal of the light detector 120 will exhibit a voltage value that is less than the peak value.

The exemplary configuration of FIG. 1 represents the situation where the planar surface 250 is in its desired position. Thus, the angle of incidence for the incidence beam 111 with respect to the planar surface 250 is same as the reference incidence angle θ1. And, correspondingly, the angle of reflection for the reflected beam 112 with respect to the planar surface 250 is same as the reference reflection angle θ2.

In another embodiment of the present invention, a collimator may be provided with the light source 110. The collimator may be a suitable set of lenses or a simple pin hole collimator 170 as shown in FIG. 1.

Figure 2:
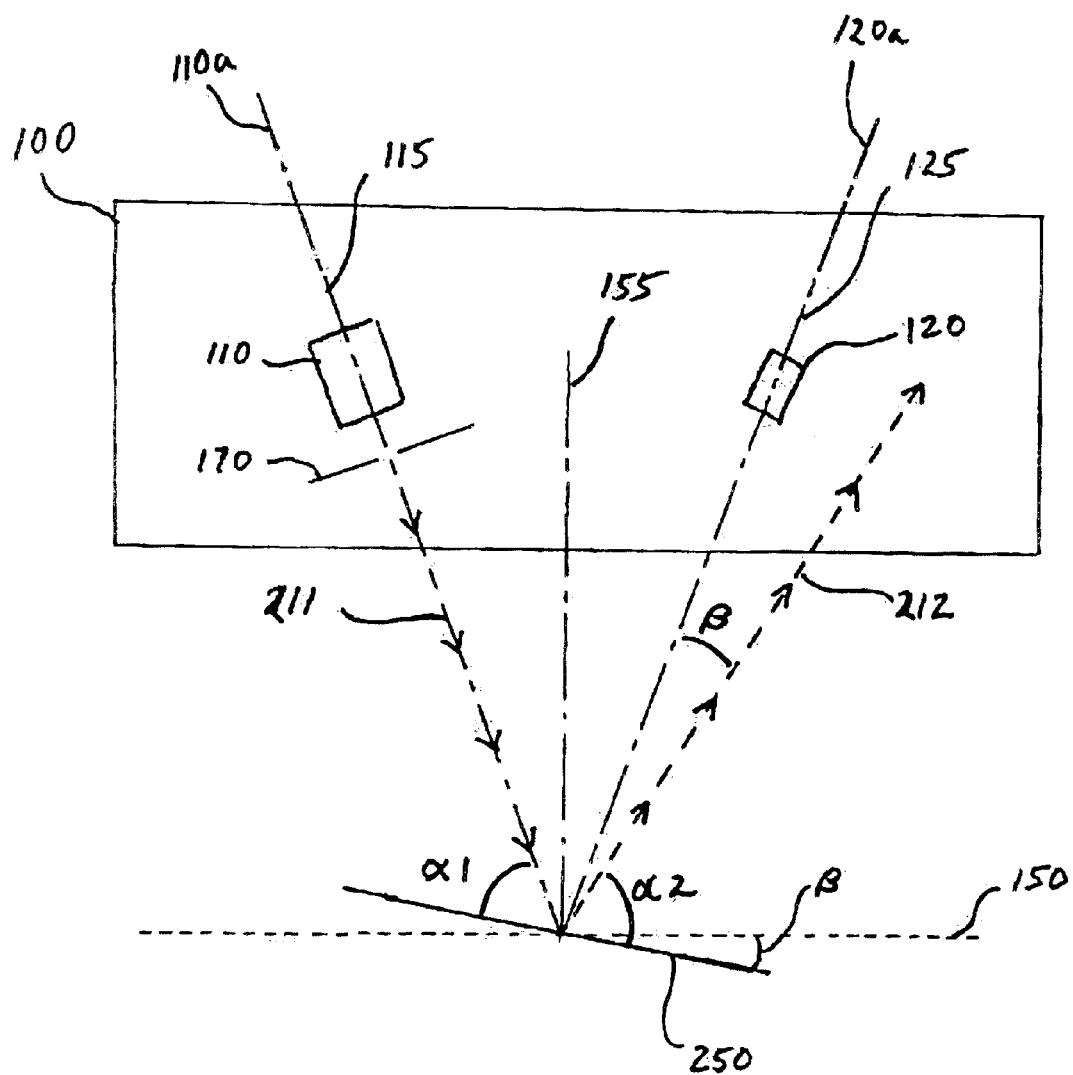
FIGS. 2–4 are schematic illustrations of the apparatus of FIG. 1 in different scenarios for various ways in which the surface being monitored can deviate from the reference plane.
Figure 3:
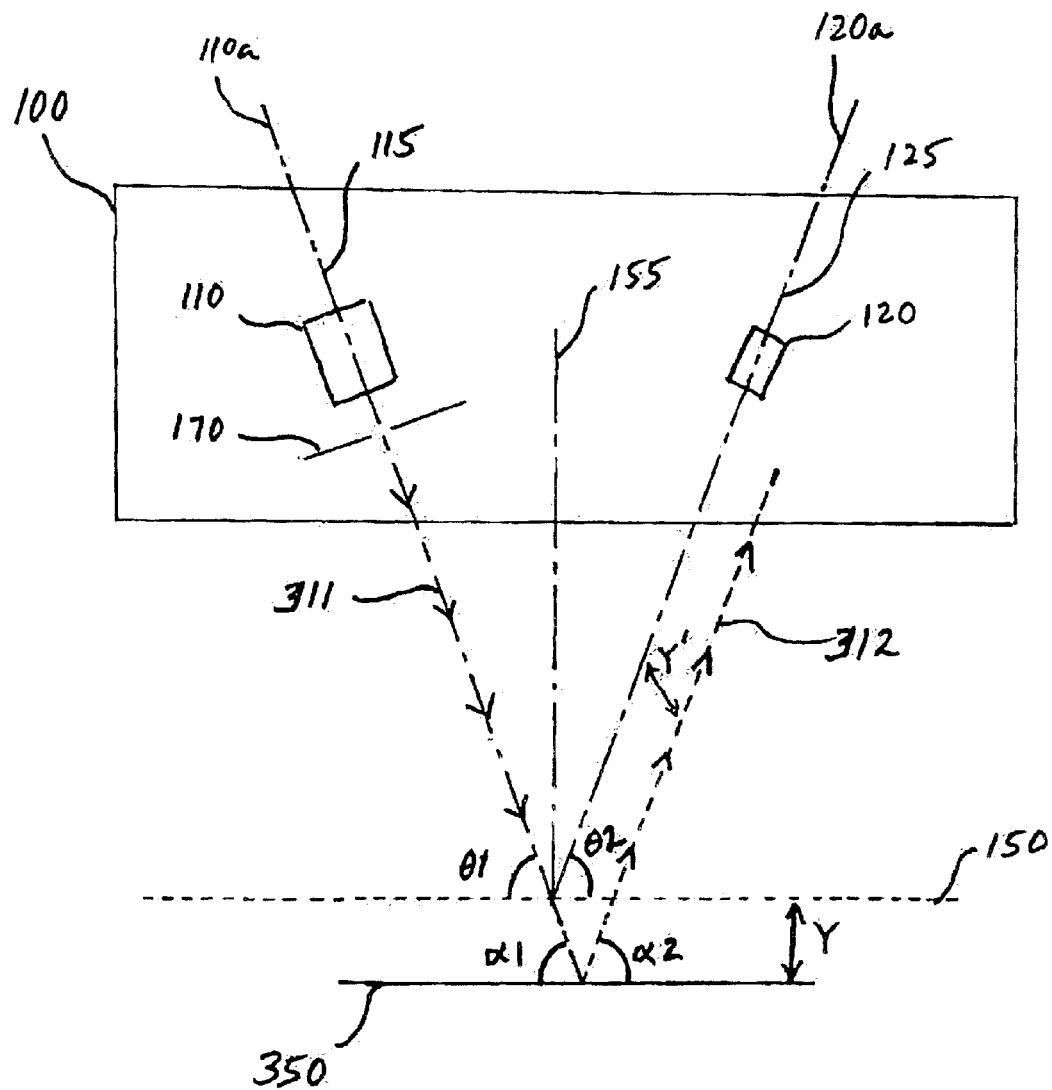

Thus, the optical level detector 100 of the present invention can be used to determine whether a planar surface has deviated from its desired position, represented by the reference plane 150 by monitoring the output signal of the light detector 120. The output signal can be monitored using any suitable circuits or devices that can measure the voltage level of the output signal. Such circuits or devices are well known to one of ordinary skill in the field and they need not be discussed in detail here. FIGS. 2 and 3 illustrate some examples of a number of different situations in which a planar surface 250 may deviate from the reference plane 150 which can be detected by the optical level detector 100.

In FIG. 2, the planar surface 250 has deviated from the reference plane 150 by an angular translation represented by angle β. The incidence beam 211 will strike the planar surface 250 at an incidence angle α1 and the reflected beam 212 leaves the planar surface 250 at a reflected angle α2. As illustrated, the resulting reflected beam 212 also has been angularly translated from the viewing axis 120a of the light detector 120 by the angle β. The reflected beam 212 is not coincident with the viewing axis 120a and no longer registers with the light detector 120. The resulting output signal of the light detector will be zero volts, signifying that the planar surface 250 has deviated from the reference plane 150. If the translation angle β is sufficiently small, the reflected beam 212 may register partially with the light detector 120. The output signal of the light detector, then, will not be zero volts but it will be something less than the peak value, still signifying that the planar surface 250 has deviated from the reference plane 150.

In FIG. 3, the planar surface 350 has deviated from the reference plane 150 by a linear translation represented by Y. The incidence beam 311 will strike the planar surface 350 at an incidence angle α1 and the reflected beam 312 leaves the planar surface 350 at a reflected angle α2. The planar surface 350 is parallel to the reference plane 150 and the incidence angle α1 and the reflected angle α2 are same as the reference incidence angle θ1 and the reference reflected angle θ2, respectively. However, the reflected beam 312 will be translated accordingly as represented by Y' and thus the reflected beam 312 will not be coincident with the viewing axis 125 of the light detector 120. Again, the reflected beam 312 will not fully register with the light detector 120 and the output signal of the light detector will be some value less than the peak value, signifying that the planar surface 350 has deviated from the reference plane 150.

Figure 4:
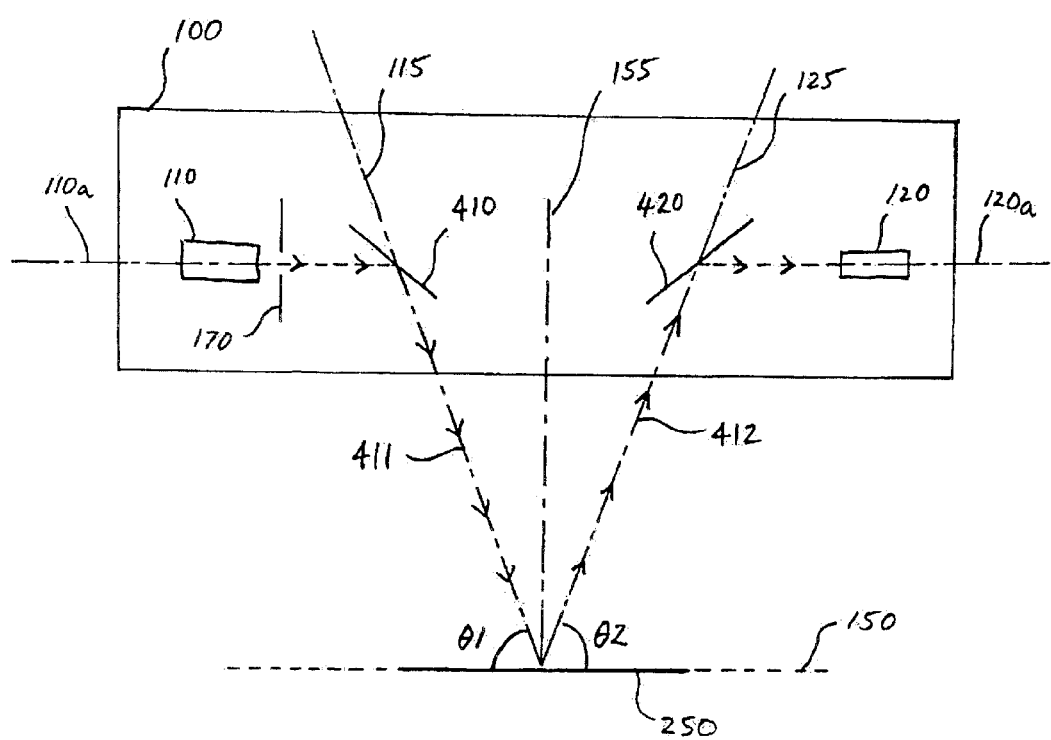

In another embodiment of the present invention, the light source 110 and the light detector 120 may be mounted in the optical level detector 100 such that they are not coincident with the projection axis 115 and the viewing axis 125, respectively, to accommodate different mounting configurations. For example, in FIG. 4, the light source 110 and the light detector 120 are mounted in horizontal configuration, but by employing reflectors 410 and 420, respectively, the incidence beam 411 and the reflected beam 412 are made to travel along the desired paths. The reflectors 410 and 420 may be mirrors, prisms or other suitable reflectors. The light source 110 and the light detector 120 may be configured in many different orientations as long as the reflectors 410 and 420 are used to direct the incidence beam 411 and the reflected beam 412 to propagate along the desired paths. As in the case of the embodiment of the present invention illustrated by FIG. 1, when the planar surface 250 is in its desired position, the light detector's projection axis 110a, the incidence axis 115, the reference reflection axis 125, and the light detector's viewing axis 120a are all coplanar with the orthogonal axis 155 of the reference plane 150.

Figure 5:
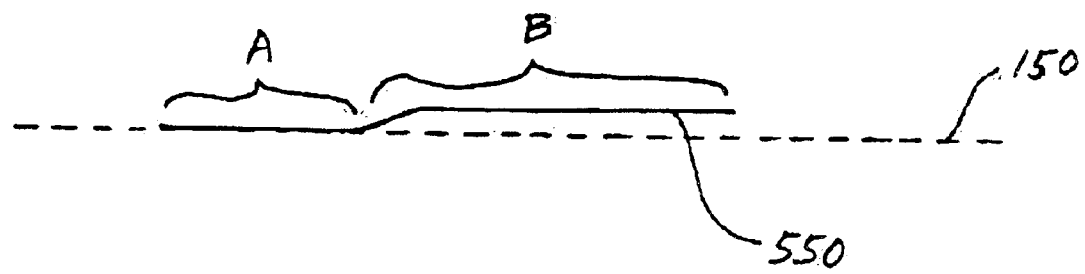
FIG. 5 is a schematic illustration of another embodiment of the apparatus of the present invention.

In certain applications, a plurality of the optical level detector 100 may be utilized to monitor positions of a plurality of surface regions on a planar surface. For example, as illustrated in FIG. 5, a planar surface 550 may have a surface region A that is on the reference plane 150 but the remainder of the planar surface 550 represented by surface region B may be deviated from the reference plane 150. If one optical level detector was monitoring the surface region A, the planar surface 550 may seem as though it is on the reference plane 150. Thus, two or more optical level detectors may be utilized to monitor a plurality of surface regions on the planar surface 550 to better detect any deviations from the reference plane 150. The inventor has applied the optical level detector of the present invention in such a manner in detecting out-of-level reticles (or photo lithographic masks) during the photolithography processes in semiconductor wafer manufacturing.

Figure 6:
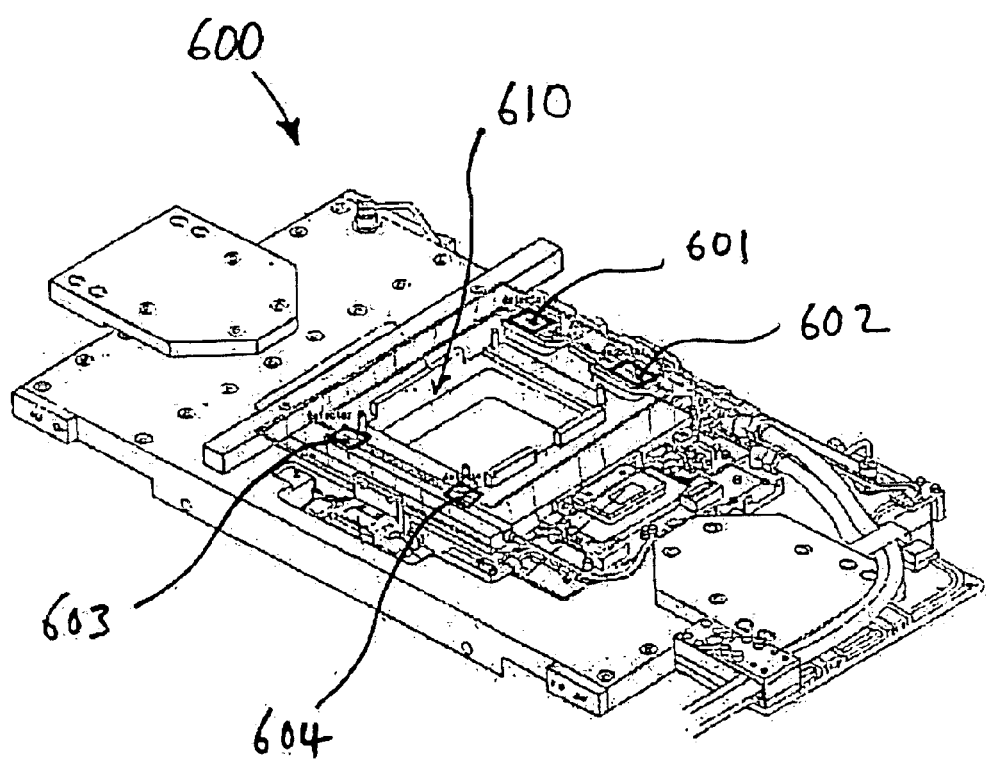
FIG. 6 is a schematic illustration of an exemplary reticle stage employing four apparatuses of the present invention on four corners of the reticle stage.

In one application, illustrated in FIG. 6, four optical level detectors similar to the embodiments described herein may be mounted on a reticle stage 600 of a stepper tool. The reticle stage has a reticle holding well 610 for holding a reticle in place. Each of the four optical level detectors may be positioned near each of the four corners of the reticle holding well 610, as identified by the reference numbers 601, 602, 603, and 604. The optical level detectors are used to monitor whether or not a reticle (not shown) placed on the reticle holding well 610 is properly leveled. Each of the four optical level detectors may be configured, for example, so that their light detectors generate peak output signal values when the reticle is properly leveled in the reticle holding well 610. The output signals of the light detectors may be monitored individually. Alternatively, the optical level detectors may be connected in series and monitor the total voltage of the output signals.

Figure 7:
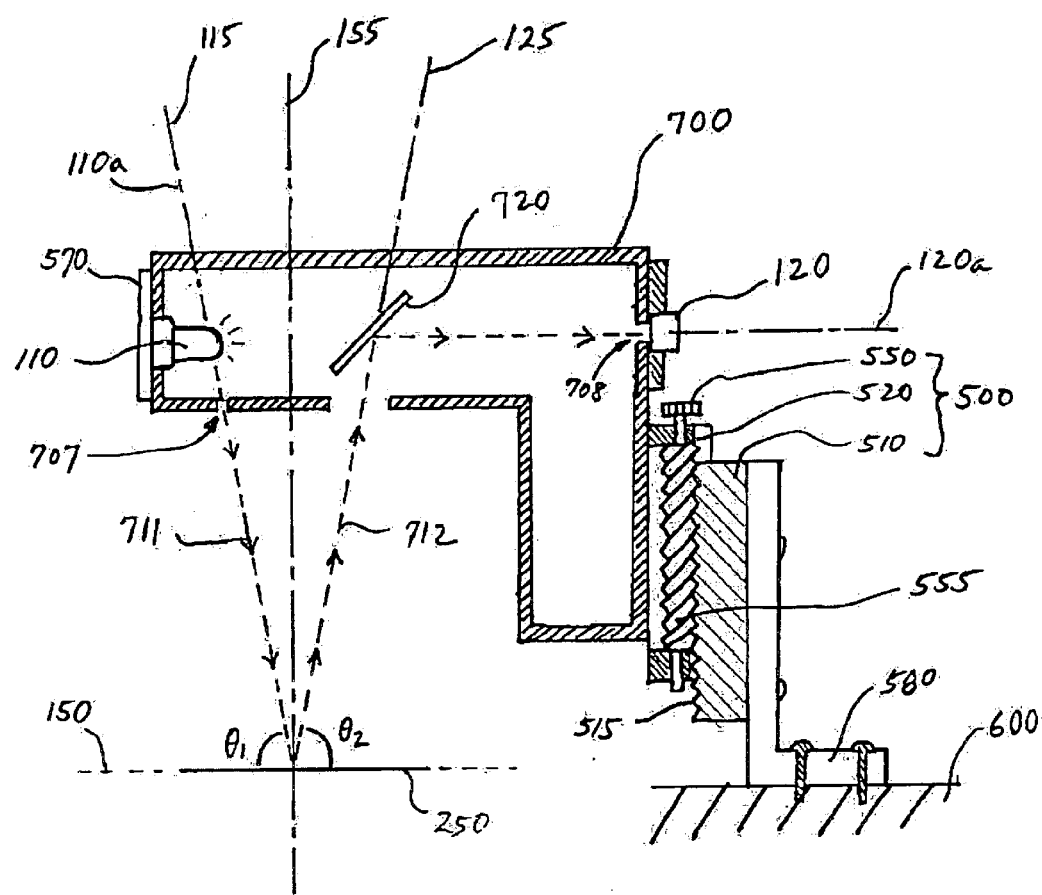
FIG. 7 is a sectional schematic illustration of another embodiment of the apparatus of the present invention.

FIG. 7 illustrates a sectional view of an optical level detector 700 as implemented by the inventor on the reticle stage 600 according to another embodiment of the present invention. The light source 110 is attached to the optical level detector 700 by a light source holding plate 570. The light source 110 projects incidence beam 711 along its projection axis 110a. In this embodiment of the present invention, the light source 110 is positioned such that the projection axis 110a is coincident with incidence axis 115. The light from the light source 110 passes through a pin hole 707 in the optical level detector 700 and emerges as the incidence beam 711. The incidence beam 711 is reflected by the planar surface 250 (representing a reticle surface) and if the planar surface 250 does not deviate from the reference plane 150, the reflected beam 712 will be coincident with the reference reflection axis 125. In this example, the light detector 120 is positioned in the optical level detector 700 in a configuration similar to that discussed in reference to FIG. 4. The light detector 120 is provided such that its viewing axis 120a is horizontally oriented and not coincident with the reference reflection axis 125. A reflector 720 is provided at an appropriate orientation so that when the planar surface 250 is at the desired location and does not deviate from the reference plane 150, the reflected beam 712 will be deflected towards the light detector 120 and fully register with the light detector 120 through the hole 708 provided in the optical level detector 700. As with the other embodiments of the present invention discussed herein, when the planar surface 250 deviates from the reference plane 150, the reflected beam 712 will no longer be in proper alignment with the reference reflection axis 125 and the reflected beam will not fully register with the light detector 120. By monitoring the electrical output signal of the light detector 120, one can thus detect whether or not the planar surface 250 is at the desired location represented by the reference plane 150.

Figure 8:
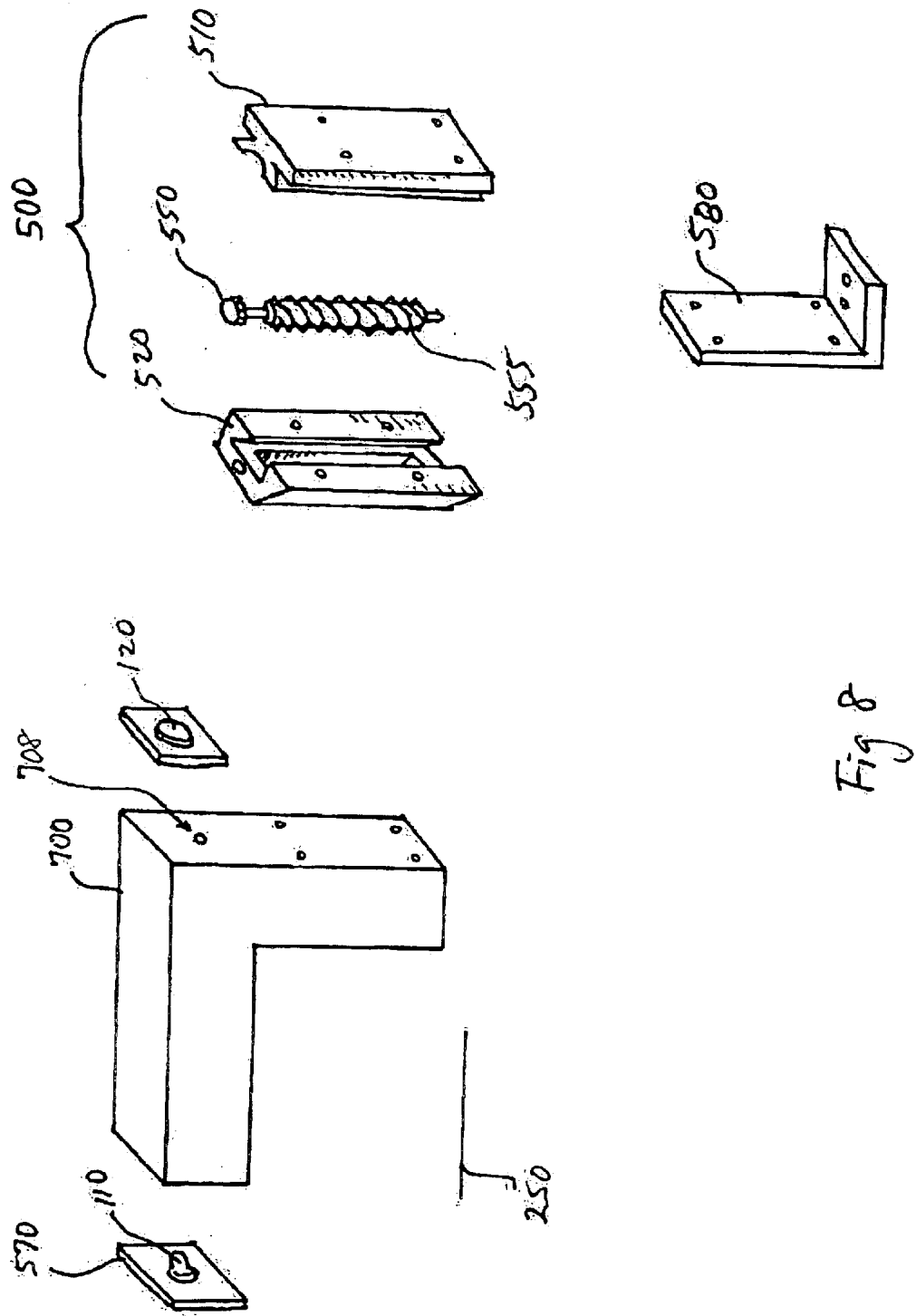
FIG. 8 is an exploded view of the apparatus of FIG. 7.

In the particular configuration implemented by the inventor, the optical level detector 700 is mounted on to the reticle stage 600 by a set of connecting hardware that allows the height of the optical level detector 700 to be adjusted relative to the reticle surface (the planar surface 250). The set of connecting hardware comprises a vertically actuating guide bearing 500 that allows the height of the optical level detector 700 to be adjusted and an L-bracket 580 for attaching the whole assembly on to the reticle stage 600. The guide bearing 500 is a standard slide/bed type comprising a slide 510 and a bed 520. To adjust and control the height of the optical level detector 700 attached to the guide bearing 500, a worm gearing set up is used. The slide 510 is provided with wormgear teeth 515 and a worm 555 is situated in the bed 520. The worm 555 has a thumb screw 550 to enable a human operator to adjust the height of the optical level detector 700 by turning the thumb screw 550. These connecting hardware may be viewed in more detail in the exploded view of the assembly illustrated in FIG. 8. As discussed in reference to FIG. 6, four of the optical level detector 700 may be installed near the four corners of the reticle holding well 610 using the connecting hardware described herein to verify that the reticle is properly leveled in the reticle holding well 610 before the stepper is operated. The vertically actuating guide bearing 500 may be of other types of guide bearing well known in the art and not necessarily limited to the slide/bed type described herein.

The use of the optical level detector of the present invention has simplified the stepper tool operator's task of verifying that the reticle is properly level in the reticle stage. While the foregoing invention has been described with reference to the above embodiments, various modifications and changes can be made without departing from the spirit of the invention. Accordingly, all such modifications and changes are considered to be within the scope of the appended claims.

What is claimed is:

1. A system for monitoring position of a reticle's top surface, the system comprising:
a reticle stage having a reticle holding well for holding the reticle in place;
a reference plane defining the position of the reticle's top surface when the reticle is properly level in the reticle stage, the reference plane having associated therewith an incidence axis and a reference reflection axis;
at least one optical level detector mounted on the reticle stage comprising a set of connecting hardware for adjusting the height of the optical level detector relative to the reticle's top surface wherein the at least one optical level detector is positioned over the reticle holding well, each of the at least one optical level detector comprising:
a light source for projecting an incidence beam of light toward the reticle's top surface along the incidence axis, wherein when the reticle's top surface is in same position as the reference plane, the incidence beam of light is reflected by the reticle's top surface into a reflected beam that is coincident with the reference reflection axis; and
a reflector for deflecting the reflected beam toward a light detector along the light detector's viewing axis and fully registers with the light detector, causing the light detector to generate a first signal value and when the planar surface's position is deviated from the reference plane, the reflected beam does not fully register with the light detector, causing the light detector to generate a second output signal value;
wherein the at least one optical level detector is used to monitor position of the reticle's top surface in relation to the reference plane by monitoring the output signal value of the optical level detector's light detector.

2. The system of claim 1, wherein the first signal value is a peak output signal of the light detector.

3. The system of claim 1, wherein the second determined signal value is an output signal of the light detector that is less than the peak output signal value.

4. The system of claim 1, wherein the at least one optical level detector comprises four optical level detectors, one optical level detector mounted near each of the four corners of the reticle holding well.

5. The system of claim 1, wherein the set of connecting hardware comprises a vertically actuating guide bearing.

6. The system of claim 5, wherein the vertically actuating guide bearing comprises a slide having wormgear teeth, a bed, and a worn situated in the bed and having a thumb screw portion for turning the worm.

7. A method of monitoring the position of a reticle's top surface in a photolithography stepper tool in relation to a reference plane, the reference plane having associated therewith an incidence axis and a reference reflection axis, the method comprising:

inserting a reticle in a reticle holding well in the photolithography stepper tool's reticle stage;

monitoring at least one optical level detector's output signal, the optical level detector being mounted on the reticle stage comprising a set of connecting hardware for adjusting the height of the optical level detector relative to the reticle's top surface, wherein the optical level detector comprising:

a light source for projecting an incidence beam of light along the light source's projection axis and on to the reticle's top surface along the incidence axis; and a light detector whose viewing axis is coincident with the reference reflection axis, wherein when the reticle's top surface is in same position as the reference plane, the incidence beam of light is reflected by the reticle's top surface into a reflected beam that is coincident with the reference reflection axis and fully registers with the light detector, causing the light detector to generate a first signal value and when the reticle's top surface's position is deviated from the reference plane, the reflected beam does not fully register with the light detector, causing the light detector to generate a second signal value.

8. The method of claim 7, wherein the set of connecting hardware comprises a vertically actuating guide bearing.

9. The method of claim 8, wherein the vertically actuating guide bearing comprises a slide having wormgear teeth, a bed, and a worm situated in the bed and having a thumb view portion for turning the worm.

* * * * *

UNITED STATES PATENT AND TRADEMARK OFFICE
CERTIFICATE OF CORRECTION

PATENT NO. : 6,832,517 B1
DATED : December 21, 2004
INVENTOR(S) : Kuo

It is certified that error appears in the above-identified patent and that said Letters Patent is hereby corrected as shown below:

Column 6,
Line 66, please delete "worn" and insert -- worm --.

Column 8,
Line 16, please delete "view" and insert -- screw --.

Signed and Sealed this

Third Day of May, 2005

JON W. DUDAS
*Director of the United States Patent and Trademark Office*